United States Patent
Yang

(10) Patent No.: US 12,004,024 B2
(45) Date of Patent: Jun. 4, 2024

(54) CELL MEASUREMENT METHOD, APPARATUS, DEVICE, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 182 days.

(21) Appl. No.: 17/264,847

(22) PCT Filed: Aug. 10, 2018

(86) PCT No.: PCT/CN2018/100040
§ 371 (c)(1),
(2) Date: Feb. 1, 2021

(87) PCT Pub. No.: WO2020/029270
PCT Pub. Date: Feb. 13, 2020

(65) Prior Publication Data
US 2021/0314827 A1    Oct. 7, 2021

(51) Int. Cl.
H04W 36/00     (2009.01)
H04W 24/10     (2009.01)
H04W 74/0833   (2024.01)

(52) U.S. Cl.
CPC ....... *H04W 36/0058* (2018.08); *H04W 24/10* (2013.01); *H04W 36/0061* (2013.01);
(Continued)

(58) Field of Classification Search
CPC ............. H04W 24/10; H04W 36/0058; H04W 36/0061; H04W 36/0072; H04W 36/0085;
(Continued)

(56) References Cited

U.S. PATENT DOCUMENTS

2017/0164349 A1    6/2017 Zhu et al.
2018/0317148 A1   11/2018 Jin et al.
(Continued)

FOREIGN PATENT DOCUMENTS

CN    102932833 A    2/2013
CN    103379562 A   10/2013
(Continued)

OTHER PUBLICATIONS

Intellectual property India, Office Action Issued in Application No. 202147009382, Jan. 25, 2022, 6 pages.
(Continued)

*Primary Examiner* — Nam T Huynh
(74) *Attorney, Agent, or Firm* — Syncoda LLC; Feng Ma

(57) ABSTRACT

A cell measurement method includes: when a cell measurement result satisfies a reporting condition, sending a measurement report to a source base station, the measurement report includes first core network type information of n respective neighbor cells for user equipment (UE), where n is a positive integer. The first core network type information indicates at least one of: a type of a core network accessed by a base station to which a respective neighbor cell belongs, or an identifier of a network slice supported by a base station to which a respective neighbor cell belongs. It can therefore be ensured that the UE is capable of work normally after handover.

20 Claims, 6 Drawing Sheets

(52) U.S. Cl.
CPC ... *H04W 36/0072* (2013.01); *H04W 36/0085* (2018.08); *H04W 74/0833* (2013.01)

(58) Field of Classification Search
CPC . H04W 74/0833; H04W 36/08; H04W 36/38; H04W 36/0011; H04W 36/0083
See application file for complete search history.

(56) References Cited

U.S. PATENT DOCUMENTS

| | | | |
|---|---|---|---|
| 2019/0159088 A1 | 5/2019 | Shi et al. | |
| 2019/0268819 A1* | 8/2019 | Kim | H04W 36/0085 |
| 2019/0274072 A1 | 9/2019 | Prasad | |
| 2020/0145843 A1* | 5/2020 | Yang | H04W 36/00835 |
| 2020/0169906 A1* | 5/2020 | Tsuboi | H04W 36/0085 |
| 2020/0305054 A1* | 9/2020 | Zee | H04W 36/0061 |
| 2021/0076241 A1* | 3/2021 | Yang | H04B 7/0626 |

FOREIGN PATENT DOCUMENTS

| | | |
|---|---|---|
| CN | 106879009 A | 6/2017 |
| CN | 106982410 A | 7/2017 |
| CN | 107734592 A | 2/2018 |
| CN | 107801220 A | 3/2018 |
| CN | 108024299 A | 5/2018 |
| CN | 108307423 A | 7/2018 |
| CN | 108307424 A | 7/2018 |
| CN | 108370530 A | 8/2018 |
| WO | 2018028698 A1 | 2/2018 |
| WO | 2018030508 A1 | 2/2018 |
| WO | 2018079691 A1 | 5/2018 |
| WO | 2018111304 A1 | 6/2018 |
| WO | 2018128076 A1 | 7/2018 |

OTHER PUBLICATIONS

Ren Rui, "PCC architecture and application analysis of LTE core network roaming scenarios", Proceedings of the 2014 Henan Provincial Communication Society Academic Annual Conference, Jul. 24, 2018, 12 pages.

NR, "Measurement report triggering", Section 5.5.4, 3rd Generation Partnership Project; Technical Specification Group Radio Access Network; Radio Resource Control (RRC) protocol specification, 3GPP TS 38.331 V15.2.0, 304 pages.

State Intellectual Property Office of the People's Republic of China, Office Action and Search Report Issued in Application No. 201880001012.2, Feb. 1, 2021, 16 pages.

European Patent Office, Extended European Search Report Issued in Application No. 18929489.5, Jul. 26, 2021, Germany, 16 pages.

ISA State Intellectual Property Office of the People's Republic of China, Written Opinion of the International Searching Authority Issued in Application No. PCT/CN2018/100040, Apr. 8, 2019, WIPO, 7 pages.

OPPO, "Further Considerations on ANR Functionality for eLTE Considering Different TAC Formats", 3GPP TSG-RAN2 Meeting #102, Busan, Korea, R2-1806702 (Revision of R2-1804539), May 21-25, 2018, 4 pages.

Samsung, "Further considerations on the CN selection for E-UTRAN connected to 5G CN", 3GPP TSG-RAN WG2 Meeting #101, Athens, Greece, R2-1802112 (revision of R2-1712171), Feb. 26-Mar. 2, 2018, 6 pages.

Intel Corporation, "Consideration on Slicing visibility to UE AS layer", 3GPP TSG RAN WG2 Meeting #97bis, Spokane, US, R2-1703442 (revision of R2-1701739), Apr. 3-7, 2017, 3 pages.

ISA State Intellectual Property Office of the People's Republic of China, International Search Report Issued in Application No. PCT/CN2018/100040, Apr. 8, 2019, WIPO, 4 pages.

State Intellectual Property Office of the People's Republic of China, Office Action and Search Report Issued in Application No. 201880001012.2, Jul. 26, 2021, 15 pages.

Intellectual property India, Hearing Notice in Reference of Application No. 202147009382, Oct. 17, 2023, 2 pages.

* cited by examiner

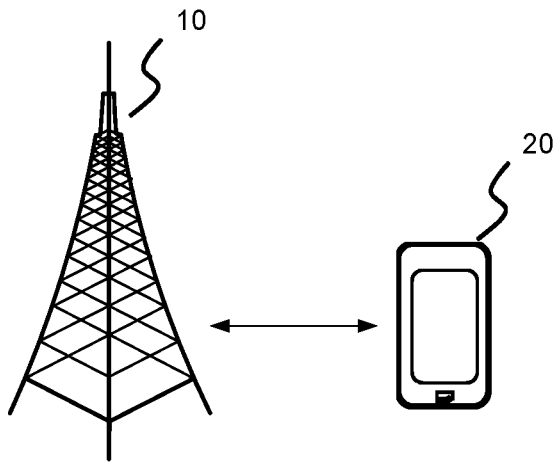

FIG. 1

When the cell measurement result satisfies the reporting condition, the UE sends a measurement report to the source base station, where the measurement report includes first core network type information of n respective neighbor cells for the UE, where n is a positive integer   201

FIG. 2 the source base station receives the measurement report from the UE, the measurement report is sent to the source base station by the UE when the cell measurement result satisfies the reporting condition, and the measurement report includes first core network type information of n respective neighbor cells for the UE, where n is a positive integer   301

FIG. 3

CELL MEASUREMENT METHOD, APPARATUS, DEVICE, AND STORAGE MEDIUM

CROSS-REFERENCE TO RELATED APPLICATION

This application is a national stage of International Application No. PCT/CN2018/100040 filed on Aug. 10, 2018, the disclosure of which is hereby incorporated by reference in its entirety.

TECHNICAL FIELD

The present disclosure relates to wireless communications, and in particular, to cell measurement methods, apparatuses and devices, and storage media.

BACKGROUND

In a wireless communication system, when user equipment (UE) moves from the service range covered by a currently accessed base station (generally referred to as source base station) to the service range covered by another base station (generally referred to as target base station), a handover is to be performed on the UE to ensure continuity of communication services.

During the handover, the UE may measure neighbor cells according to an instruction from the source base station, and report a measurement report to the source base station. The source base station may determine the target base station from respective base stations to which the neighbor cells belong according to the measurement report, and then the source base station may disconnect the UE from itself and indicate the UE to establish a connection with the target base station.

In practical applications, different base stations may be connected to core networks of different types: alternatively, different base stations may support different network slices. The communication services provided by core networks of different types or different network slices are not the same. When neither the core network to which the target base station is connected nor the network slice supported by the target base station can provide desired communication services to the UE, the UE cannot work normally after the handover. Therefore, how to ensure the UE work normally after the handover in the practical applications has become a problem to be solved.

SUMMARY

The embodiments of the present disclosure provide cell measurement methods, apparatuses, devices and storage media, ensuring that a UE may operate normally after handover.

According to a first aspect of embodiments of the present disclosure, a cell measurement method is provided and includes: when a cell measurement result satisfies a reporting condition, sending a measurement report to a measurement report to a source base station, the measurement report including first core network type information of n respective neighbor cells for user equipment (UE), where n is a positive integer: and wherein the first core network type information indicates at least one of: a type of a core network accessed by a base station to which a respective neighbor cell belongs, or an identifier of a network slice supported by a base station to which a respective neighbor cell belongs.

Optionally, the method further includes: receiving, from the source base station, measurement configuration information which instructs the UE to report the first core network type information of the n respective neighbor cells to the source base station in the measurement report. When the cell measurement result satisfies the reporting condition, sending the measurement report to the source base station includes: when the cell measurement result satisfies the reporting condition, sending the measurement report to the source base station according to the instruction of the measurement configuration information.

Optionally, when the cell measurement result satisfies the reporting condition, sending the measurement report to the source base station includes: sending the measurement report including the first core network type information to the source base station, when the cell measurement result satisfies the reporting condition and uplink resources allocated to the UE by the source base station are not fully occupied by another data than the first core network type information in the measurement report.

Optionally, the method further includes: receiving system information broadcasted by a base station to which each of the n neighbor cells belongs: wherein system information broadcasted by a base station to which a target neighbor cell belongs includes at least one of: a type of a core network accessed by the base station to which the target neighbor cell belongs, or an identifier of a network slice supported by the base station to which the target neighbor cell belongs, where the target neighbor cell is any one of the n respective neighbor cells. When the cell measurement result satisfies the reporting condition, sending the measurement report to the source base station includes: obtaining first core network type information of each of the n respective neighbor cells according to the system information broadcasted by the base station to which each of the n neighbor cell belongs, and sending the measurement report including the first core network type information to the source base station when the cell measurement result satisfies the reporting condition.

Optionally, the n neighbor cells include a first neighbor cell, and a frequency of the first neighbor cell is a frequency that the source base station instructs the UE to measure.

Optionally, the n neighbor cells include a second neighbor cell, and a frequency of the second neighbor cell is not a frequency that the source base station instructs the UE to measure.

Optionally, when the first core network type information indicates the type of the core network accessed by the base station to which the respective neighbor cell belongs, the method further includes: receiving handover signaling from the source base station: initiating random access to a target base station according to an instruction of the handover signaling: wherein the target base station is determined by the source base station from the base stations to which the n respective neighbor cells belong according to the first core network type information, and a type of a core network accessed by the target base station is the same as a type of a core network to be accessed by the UE.

Optionally, when the first core network type information indicates the identifier of the network slice supported by the base station to which the respective neighbor cell belongs, the method further includes: receiving handover signaling from the source base station: initiating random access to the target base station according to an instruction of the handover signaling: wherein the target base station is determined by the source base station from the base stations to which the n respective neighbor cells belong according to the first core network type information, and the identifier of the network slice supported by the target base station is the same as an identifier of a network slice to be accessed by the UE.

Optionally, the method further includes: sending second core network type information to the source base station, wherein the second core network type information indicates the type of the core network to be accessed by the UE, and wherein the second core network type information is used for the source base station to determine the target base station from base stations to which the n respective neighbor cells belong, according to the second core network type information and the first core network type information.

Optionally, the method further includes: sending third core network type information to the source base station, wherein the third core network type information indicates the identifier of the network slice to be accessed by the UE, and wherein the third core network type information is used for the source base station to determine the target base station from the base stations to which the n respective neighbor cells belong, according to the third core network type information and the first core network type information.

According to a second aspect of an embodiment of the present disclosure, a cell measurement method is provided, which includes: receiving a measurement report being sent from user equipment (UE) to a source base station when a cell measurement result satisfies a reporting condition, and including first core network type information of n respective neighbor cells for the UE, and n is a positive integer: wherein the first core network type information indicates at least one of: a type of a core network accessed by a base station to which a respective neighbor cell belongs, or an identifier of a network slice supported by a base station to which a respective neighbor cell belongs.

Optionally, the method further includes: sending measurement configuration information to the UE, wherein the measurement configuration information instructs the UE to report the first core network type information of the n respective neighbor cells to the source base station in the measurement report.

Optionally, the measurement report is sent from the UE to the source base station when the cell measurement result satisfies the reporting condition, and uplink resources allocated to the UE by the source base station are not fully occupied by another data than the first core network type information in the measurement report.

Optionally, the first core network type information of the n respective neighbor cells is obtained by the UE according to system information broadcasted by a base station to which each of the n neighbor cells belongs: system information broadcasted by a base station to which a target neighbor cell belongs includes at least one of: a type of a core network accessed by the base station to which the target neighbor cell belongs, or an identifier of a network slice supported by the base station to which the target neighbor cell belongs, where the target neighbor cell is any one of the n respective neighbor cells.

Optionally, the n neighbor cells include a first neighbor cell, and a frequency of the first neighbor cell is a frequency that the source base station instructs the UE to measure: or, the n neighbor cells include a second neighbor cell, and a frequency of the second neighbor cell is not a frequency that the source base station instructs the UE to measure.

Optionally, when the first core network type information indicates the type of the core network accessed by the base station to which the respective neighbor cell belongs, the method further includes: determining, according to the first core network type information, a target base station from base stations to which the n neighbor cells belong, wherein a type of a core network accessed by the target base station is the same as a type of a core network to be accessed by the UE: sending handover signaling to the UE, wherein the handover signaling instructs the UE to initiate random access to the target base station.

Optionally, the method further includes: receiving second core network type information from the UE, wherein the second core network type information indicates a type of a core network to be accessed by the UE: determining the target base station from the base stations to which the n respective neighbor cells belong according to the first core network type information includes: determining, according to the first core network type information and the second core network type information, the target base station from the base stations to which the n respective neighbor cells belong.

Optionally, determining the target base station from the base stations to which the n respective neighbor cells belong according to the first core network type information includes: obtaining a type of a core network accessed by the source base station: determining the type of the core network accessed by the source base station as the type of the core network to be accessed by the UE: and determining, according to the first core network type information and the type of the core network to be accessed by the UE, the target base station from the base stations to which the n respective neighbor cells belong.

Optionally, when the first core network type information indicates the identifier of the network slice supported by the base station to which the respective neighbor cell belongs, the method further includes: determining, according to the first core network type information, a target base station from base stations to which the n neighbor cells belong, wherein the identifier of the network slice supported by the target base station is the same as an identifier of a network slice to be accessed by the UE: and sending handover signaling to the UE, wherein the handover signaling instructs the UE to initiate random access to the target base station.

Optionally, the method further includes: receiving third core network type information from the UE, wherein the third core network type information indicates the identifier of the network slice to be accessed by the UE. Determining, according to the first core network type information, a target base station from base stations to which the n neighbor cells belong includes: determining, according to the first core network type information and the third core network type information, the target base station from the base stations to which the n respective neighbor cells belong.

Optionally, determining the target base station from the base stations to which the n respective neighbor cells belong according to the first core network type information includes: obtaining the identifier of the network slice supported by the source base station: determining the identifier of the network slice supported by the source base station as the identifier of the network slice to be accessed by the UE: and determining, according to the first core network type information and the identifier of the network slice to be accessed by the UE, the target base station from the base stations to which the n respective neighbor cells belong.

According to a third aspect of embodiments of the present disclosure, cell measurement apparatuses are provided, including a first sending module, configured to send a measurement report to a source base station when a cell measurement result satisfies a reporting condition, wherein the measurement report includes first core network type information of n respective neighbor cells for user equipment (UE), where n is a positive integer: wherein the first core network type information indicates at least one of: a type of a core network accessed by a base station to which a respective neighbor cell belongs, or an identifier of a network slice supported by a base station to which a respective neighbor cell belongs.

Optionally, the apparatus further includes a first receiving module configured to receive, from the source base station, measurement configuration information which instructs the UE to report the first core network type information of the n respective neighbor cells to the source base station in the measurement report: the first sending module is configured to send the measurement report to the source base station according to the instruction of the measurement configuration information when the cell measurement result satisfies the reporting condition.

Optionally, the first sending module is configured to send the measurement report including the first core network type information to the source base station, when the cell measurement result satisfies the reporting condition and when uplink resources allocated to the UE by the source base station are not fully occupied by another data than the first core network type information in the measurement report.

Optionally, the apparatus further includes a second receiving module configured to receive system information broadcasted by a base station to which each of the n neighbor cells belongs: wherein system information broadcasted by a base station to which a target neighbor cell belongs includes at least one of: a type of a core network accessed by the base station to which the target neighbor cell belongs, or an identifier of a network slice supported by the base station to which the target neighbor cell belongs, and wherein the target neighbor cell is any one of the n respective neighbor cells: the first sending module is configured to obtain first core network type information of each of the n respective neighbor cells according to the system information broadcasted by the base station to which each of the n neighbor cell belongs: and send the measurement report including the first core network type information to the source base station when the cell measurement result satisfies the reporting condition.

Optionally, the n neighbor cells include a first neighbor cell, and a frequency of the first neighbor cell is a frequency that the source base station instructs the UE to measure.

Optionally, the n neighbor cells include a second neighbor cell, and a frequency of the second neighbor cell is not a frequency that the source base station instructs the UE to measure.

Optionally, when the first core network type information indicates the type of the core network accessed by the base station to which the respective neighbor cell belongs, the apparatus further includes a third receiving module, configured to receive handover signaling from the source base station, and a first access module configured to initiate random access to a target base station according to an instruction of the handover signaling. The target base station is determined by the source base station from the base stations to which the n respective neighbor cells belong according to the first core network type information, and a type of a core network accessed by the target base station is the same as a type of a core network to be accessed by the UE.

Optionally, when the first core network type information indicates the identifier of the network slice supported by the base station to which the respective neighbor cell belongs, the apparatus further includes, a fourth receiving module, configured to receive handover signaling from the source base station, and a second access module configured to initiate random access to the target base station according to an instruction of the handover signaling: wherein the target base station is determined by the source base station from the base stations to which the n respective neighbor cells belong according to the first core network type information, and the identifier of the network slice supported by the target base station is the same as an identifier of a network slice to be accessed by the UE.

Optionally, the apparatus further includes a second sending module configured to send second core network type information to the source base station, wherein the second core network type information indicates the type of the core network to be accessed by the UE, and wherein the second core network type information is used for the source base station to determine the target base station from base stations to which the n respective neighbor cells belong, according to the second core network type information and the first core network type information.

Optionally, the apparatus further includes a third sending module configured to send third core network type information to the source base station, wherein the third core network type information indicates the identifier of the network slice to be accessed by the UE, and wherein the third core network type information is used for the source base station to determine the target base station from the base stations to which the n respective neighbor cells belong, according to the third core network type information and the first core network type information.

According to a fourth aspect of embodiments of the present disclosure, cell measurement apparatuses are provided, including: a first receiving module, configured to receive a measurement report being sent from user equipment (UE) to a source base station when a cell measurement result satisfies a reporting condition and including first core network type information of n respective neighbor cells for the UE, where n is a positive integer. The first core network type information indicates at least one of: a type of a core network accessed by a base station to which a respective neighbor cell belongs, or an identifier of a network slice supported by a base station to which a respective neighbor cell belongs.

Optionally, the apparatus further includes a first sending module, configured to send measurement configuration information to the UE, wherein the measurement configuration information instructs the UE to report the first core network type information of the n respective neighbor cells to the source base station in the measurement report.

Optionally, the measurement report is sent from the UE to the source base station when the cell measurement result satisfies the reporting condition, and uplink resources allocated to the UE by the source base station are not fully occupied by another data than the first core network type information in the measurement report.

Optionally, the first core network type information of the n respective neighbor cells is obtained by the UE according to system information broadcasted by a base station to which each of the n neighbor cells belongs: system information broadcasted by a base station to which a target neighbor cell belongs includes at least one of: a type of a core network accessed by the base station to which the target neighbor cell belongs, or an identifier of a network slice supported by the base station to which the target neighbor cell belongs, where the target neighbor cell is any one of the n respective neighbor cells.

Optionally, the n neighbor cells include a first neighbor cell, and a frequency of the first neighbor cell is a frequency that the source base station instructs the UE to measure.

Optionally, the n neighbor cells include a second neighbor cell, and a frequency of the second neighbor cell is not a frequency that the source base station instructs the UE to measure.

Optionally, when the first core network type information indicates the type of the core network accessed by the base station to which the respective neighbor cell belongs, the apparatus further includes a first determining module, configured to determine a target base station from base stations to which the n neighbor cells belong according to the first core network type information, wherein a type of a core network accessed by the target base station is the same as a type of a core network to be accessed by the UE: and a second sending module, configured to send handover signaling to the UE, wherein the handover signaling instructs the UE to initiate random access to the target base station.

Optionally, the apparatus further includes a second receiving module, configured to receive second core network type information from the UE, wherein the second core network type information indicates a type of a core network to be accessed by the UE. The first determining module is configured to determine the target base station from the base stations to which the n respective neighbor cells belong according to the first core network type information and the second core network type information.

Optionally, the first determining module is configured to obtain a type of a core network accessed by the source base station: determine the type of the core network accessed by the source base station as the type of the core network to be accessed by the UE: and determine, according to the first core network type information and the type of the core network to be accessed by the UE, the target base station from the base stations to which the n respective neighbor cells belong.

Optionally, when the first core network type information indicates the identifier of the network slice supported by the base station to which the respective neighbor cell belongs, the apparatus further includes a second determining module, configured to determine a target base station from base stations to which the n neighbor cells belong according to the first core network type information, wherein the identifier of the network slice supported by the target base station is the same as an identifier of a network slice to be accessed by the UE: and a third sending module, configured to send handover signaling to the UE, wherein the handover signaling instructs the UE to initiate random access to the target base station.

Optionally, the apparatus further includes a third receiving module, configured to receive third core network type information from the UE, wherein the third core network type information indicates the identifier of the network slice to be accessed by the UE; and a second determining module, configured to determine the target base station from the base stations to which the n respective neighbor cells belong according to the first core network type information and the third core network type information.

Optionally, the second determining module is configured to obtain the identifier of the network slice supported by the source base station: determine the identifier of the network slice supported by the source base station as the identifier of the network slice to be accessed by the UE: and determining, according to the first core network type information and the identifier of the network slice to be accessed by the UE, the target base station from the base stations to which the n respective neighbor cells belong.

According to a fifth aspect of embodiments of the present disclosure, user equipment (UE) are provided, including: a processor and memory for storing instructions executed by the processor. The processor is configured to: when a cell measurement result satisfies a reporting condition, send a measurement report to a source base station. The measurement report comprises first core network type information of n respective neighbor cells for the UE, where n is a positive integer. The first core network type information indicates at least one of a type of a core network accessed by a base station to which a respective neighbor cell belongs or an identifier of a network slice supported by a base station to which a respective neighbor cell belongs.

According to a sixth aspect of embodiments of the present disclosure, base stations are provided, including: a processor and memory for storing instructions executed by the processor. The processor is configured to: receive a measurement report being sent from user equipment (UE) to a source base station when a cell measurement result satisfies a reporting condition, and comprising first core network type information of n respective neighbor cells for the UE, where n is a positive integer. The first core network type information indicates at least one of: a type of a core network accessed by a base station to which a respective neighbor cell belongs, or an identifier of a network slice supported by a base station to which a respective neighbor cell belongs.

According to a seventh aspect of embodiments of the present disclosure, cell measurement systems are provided, including the cell measurement apparatus according to any one of the foregoing third aspect and the cell measurement apparatus according to any one of the foregoing fourth aspect.

According to an eighth aspect of embodiments of the present disclosure, computer-readable storage media storing a computer program are provided, the cell measurement methods according to any one of the foregoing first aspect are implemented when the computer program stored in the computer-readable storage medium is executed by a processing component: or, the cell measurement methods of according to any one of the foregoing second aspect are implemented when the stored computer program is executed by the processing component The technical solutions provided by the embodiments of the present disclosure may at least include the following beneficial effects.

In response to that a cell measurement result satisfies a reporting condition, a measurement report is sent to a source base station, wherein the measurement report includes first core network type information of n respective neighbor cells for the UE, and the first core network type information indicates at least one of the type of the core network accessed by the base station to which the respective neighbor cell belongs or the identifier of the network slice supported by the base station to which the respective neighbor cell belongs. As such, the source base station may determine, according to the measurement report, a target base station from base stations to which the n respective neighbor cells belong, and hand over the UE to the target base station, either the core network to which the target base station is connected or the network slice which is supported by the target base station is capable of providing desired communication services to the UE, such that the UE may work normally after handover.

It should be understood that the above general description and the following detailed description are merely exemplary and explanatory and do not limit the disclosure.

BRIEF DESCRIPTION OF DRAWINGS

The accompanying drawings herein are incorporated in and constitute a part of this disclosure, illustrate embodiments consistent with the present disclosure, and together with the description serve to explain the principles of the disclosure.

FIG. 1 is a schematic diagram of an implementation environment according to exemplary embodiments.

FIG. 2 is a flowchart of cell measurement methods according to exemplary embodiments.

FIG. 3 is a flowchart of cell measurement methods according to exemplary embodiments.

DETAILED DESCRIPTION

Figure 4:
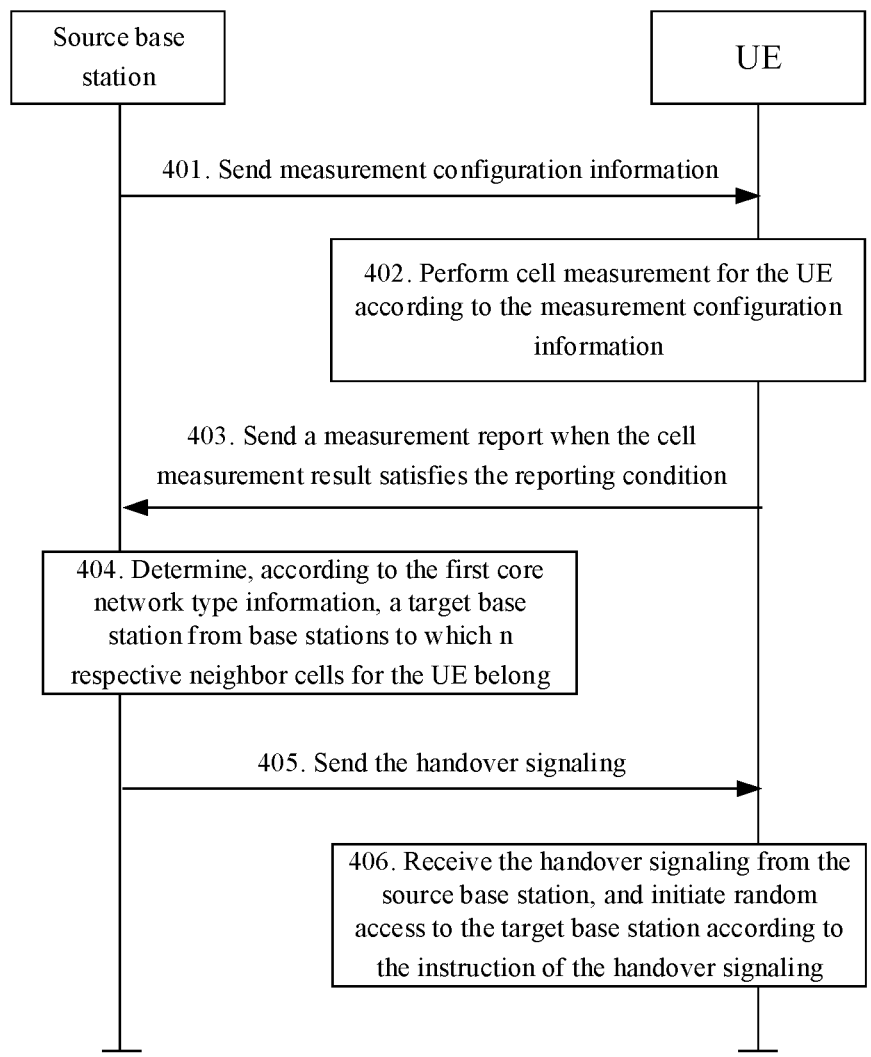
FIG. 4 is a flowchart of cell measurement methods according to exemplary embodiment.

In order to make the objects, technical solutions and advantages of the present disclosure more apparent, the embodiments of the present disclosure will be further described in detail below with reference to the accompanying drawings.

Exemplary embodiments will be described in detail herein, examples of which are shown in the figures. The following description relates to the drawings, unless otherwise indicated, the same numerals in the different figures represent the same or similar elements. The embodiments described in the following exemplary embodiments do not represent all embodiments consistent with the present disclosure. Rather, they are merely examples of devices and methods consistent with some aspects of the disclosure as detailed in the appended claims.

In wireless communication systems, a service range covered by a base station is generally limited. Therefore, in order to support the mobility and the continuity of communication services of UE, when the UE moves from the service range covered by the currently accessed base station (also known as the source base station) to another service range covered by a base station (also known as the target base station), a handover for the UE needs to be performed.

In practical implementations, during handover, the UE may perform cell measurement based on the measurement configuration information sent from the source base station, and when the measurement result satisfies a reporting condition (for example, the reporting condition may be that the signal of the neighbor cell is better than the signal of the cell where the UE is currently located), the UE may send the measurement report to the source base station. The measurement report may include a Physical Cell Identifier (PCI for short) of at least one neighbor cell and signal strength of the at least one neighbor cell, wherein the signal strength of the neighbor cell may generally be characterized by Reference Signal Receiving Power (RSRP for short) or Reference Signal Receiving Quality (RSRQ for short) of the neighbor cell.

Upon receiving the measurement report, the source base station may determine that the UE is remote from the service range covered by the source base station. In this case, the source base station may determine a target neighbor cell based on the signal strength of at least one neighbor cell in the measurement report, and the target neighbor cell may be generally a neighbor cell with the strongest signal strength in the at least one neighbor cell. The source base station may determine the base station to which the target neighbor cell belongs according to the PCI of the target neighbor cell, where the base station is the target base station. Then, the source base station may send a handover request to the target base station, and send handover signaling (for example, RRC Connection Reconfiguration) to the UE to perform the handover.

Types of core networks connected to different base stations are likely to be different, and the communication services provided by different types of core networks are not the same. When the type of the core network connected to the target base station determined by the source base station according to the measurement report is different from the type of the core network that the UE needs to access, the core network connected to the target base station cannot provide the communication service(s) for the UE. In this case, the UE cannot work normally after handover.

In addition, with further development of communication technologies, different network slices supported by different base stations are likely to occur in the future. The communication services that may be provided by different network slices are also different. When the network slice supported by the target base station which are determined by the source base station according to the measurement report are different from the network slice to be accessed by the UE, the network slice supported by the target base station cannot provide desired communication service to the UE. In this case, the UE cannot work normally after handover.

In practical applications, different communication services have different requirements in terms of network function, system performance and security. If a same network provides services for different communication services, it will lead to the complexity of this network, and may be impossible to achieve the limitation performance requirements for different communication services.

In contrast, if proprietary networks are deployed to provide services for different communication services according to the requirements of different communication services, the proprietary networks may include only the functions required by the corresponding communication services, rendering the proprietary networks simpler and convenient for later operation and maintenance. The proprietary network described above is considered as one network slice.

In general, a network slice refers to a set of network functions, resources running the network functions, and specific configurations of the network functions. In other words, a network slice may be regarded as a virtual network or a logical network, which includes functions required for satisfying a specific communication service, and may provide the specific communication service.

In cell measurement methods provided by the embodiments of the present disclosure, the UE may work normally after handover. In the cell measurement methods, when the cell measurement result satisfies the reporting condition, the UE may send a measurement report to a source base station, wherein the measurement report includes first core network type information of n respective neighbor cells for the UE. The first core network type information indicates a type of a core network accessed by a base station to which a respective neighbor cell belongs and/or an identifier of a network slice supported by a base station to which a respective neighbor cell belongs. As such, the source base station may determine, according to the measurement report, a target base station from base stations to which the n respective neighbor cells belong, and hand over the UE to the target base station, either the core network to which the target base station is connected or the network slice which is supported by the target base station is capable of providing desired communication services to the UE, such that the UE may work normally after handover.

The implementation environment involved in the cell measurement methods provided by the embodiments of the present disclosure will be described below.

FIG. 1 is a schematic diagram of an implementation environment involved in cell measurement methods according to embodiments of the present disclosure. As shown in FIG. 1, the implementation environment may include a source base station 10 and a UE 20. The source base station 10 may be connected to UE 20 via a communication network, and the UE 20 is any UE in a cell served by the source base station 10.

The communication network may be at least one of a 5G (The Fifth Generation Mobile Communication Technology) communication network, an LTE (Long Term Evolution) communication network, or other communication networks similar to the 5G communication network and the LTE communication network.

The source base station 10 may be connected to a core network NGCN (Next Generation Core Network) in a 5G communication network and/or to a core network EPC (Evolved Packet Core) in an LTE communication network. In addition, the source base station 10 may support a network slice which is capable of providing the target communication service.

FIG. 2 is a flowchart of cell measurement methods according to exemplary embodiments. As shown in FIG. 2, the cell measurement methods are used in the UE 20 shown in FIG. 1 and may include the following steps.

Step 201: When the cell measurement result satisfies the reporting condition, the UE sends a measurement report to the source base station.

The measurement report includes first core network type information of n respective neighbor cells for the UE, where n is a positive integer.

The first core network type information indicates at least one of a type of a core network accessed by a base station to which a respective neighbor cell belongs or an identifier of a network slice supported by a base station to which a respective neighbor cell belongs.

In the cell measurement methods provided by the embodiments of the present disclosure, when the cell measurement result satisfies the reporting condition, a measurement report is sent to a source base station, wherein the measurement report includes first core network type information of n respective neighbor cells for the UE, and the first core network type information indicates at least one of the type of the core network accessed by the base station to which the respective neighbor cell belongs or the identifier of the network slice supported by the base station to which the respective neighbor cell belongs. As such, the source base station may determine, according to the measurement report, a target base station from base stations to which the n respective neighbor cells belong, and hand over the UE to the target base station, either the core network to which the target base station is connected or the network slice which is supported by the target base station is capable of providing desired communication services to the UE, such that the UE may work normally after handover.

FIG. 3 is a flowchart of cell measurement methods according to exemplary embodiments. As shown in FIG. 3, the cell measurement methods are used in the source base station 10 shown in FIG. 1, and the cell measurement methods may include the following steps.

Step 301, the source base station receives the measurement report from the UE.

The measurement report is sent to the source base station by the UE when the cell measurement result satisfies the reporting condition, and the measurement report includes first core network type information of n respective neighbor cells for the UE, where n is a positive integer.

The first core network type information indicates at least one of a type of a core network accessed by a base station to which a respective neighbor cell belongs or an identifier of a network slice supported by a base station to which a respective neighbor cell belongs.

In the cell measurement methods provided by the embodiments of the present disclosure, the source base station receives a measurement report from a UE when a cell measurement result satisfies a reporting condition where the measurement report includes first core network type information of n respective neighbor cells for the UE. The first core network type information indicates a type of a core network accessed by a base station to which a respective neighbor cell belongs and/or an identifier of a network slice supported by a base station to which a respective neighbor cell belongs. As such, the source base station may determine, according to the measurement report, a target base station from base stations to which the n respective neighbor cells belong, and hand over the UE to the target base station, either the core network to which the target base station is connected or the network slice which is supported by the target base station is capable of providing desired communication services to the UE, such that the UE may work normally after handover.

FIG. 4 is a flowchart of cell measurement methods according to exemplary embodiments. As shown in FIG. 4, the cell measurement methods are used in the implementation environment shown in FIG. 1, and the cell measurement methods include the following steps.

Step 401: The source base station sends measurement configuration information to the UE.

During handover of the UE, the source base station may send measurement configuration information to the UE through RRC Connection Reconfiguration signaling, where the measurement configuration information instructs the UE to measure a neighbor cell of itself.

In embodiments of the present disclosure, the measurement configuration information may include core network type reporting information, where the core network type reporting information instructs the UE to report first core network type information of n respective neighbor cells for the UE in a measurement report sent to the source base station, where n is a positive integer.

The first core network type information indicates at least one of a type of a core network accessed by a base station to which a respective neighbor cell belongs or an identifier of a network slice supported by a base station to which a respective neighbor cell belongs.

For example, the first core network type information of the respective neighbor cell a for the UE may indicate at least one of the followings: 1, the type of the core network accessed by the base station to which the neighbor cell a belongs is an NGCN type; 2, the identifier of the network slice supported by the base station to which the neighbor cell a belongs is bb.

Step 402: Cell measurement for the UE is performed according to the measurement configuration information.

As an example, upon receiving the measurement configuration information from the source base station, according to the instruction of the measurement configuration information, the UE may perform a measurement on neighbor cells with frequency instructed by the measurement configuration information and thereby obtain the RSRP or RSRQ of the neighbor cells with the frequency instructed by the measurement configuration information.

As another example, upon receiving the measurement configuration information from the source base station, the UE may autonomously determine the frequency that needs to be measured according to the instruction of the measurement configuration information, and perform a measurement on the neighbor cells with the autonomously determined to-be-measured frequency, thereby obtaining an RSRP or an RSRQ of the neighbor cells with the autonomously determined to-be-measured frequency.

The manner in which the UE autonomously determines the frequency that needs to be measured and perform a measurement on the neighbor cells with the autonomously determined to-be-measured frequency may improve the flexibility of the UE for measuring the neighbor cell. Moreover, the UE measures the neighbor cells with the frequency instructed by the measurement configuration information, to ensure the controllability of the UE to measure the neighbor cell and reduce the power consumption measured by the UE.

Step 403: When the cell measurement result satisfies the reporting condition, the UE sends a measurement report to the source base station.

The reporting condition of the cell measurement result may be referred to in the prior art, which is not limited in the embodiments of the present disclosure.

Optionally, if the measurement configuration information from the source base station includes core network type reporting information, the UE may send a measurement report to the source base station according to the indication of the core network type reporting information. In addition to the PCI of the n neighbor cells for the UE and the RSRP or RSRQ of the n neighbor cells, the measurement report from the UE may further include first core network type information of the n respective neighbor cells.

Optionally, if the measurement configuration information issued by the source base station does not include the core network type reporting information, the UE may determine whether data, other than the first core network type information in the measurement report, may fully occupy uplink resources allocated to the UE reporting the measurement report by the source base station, before sending the measurement report to the source base station. The data other than the first core network type information in the measurement report may include PCIs of n neighbor cells for the UE and RSRP or RSRQ of the n neighbor cells.

If the data other than the first core network type information in the measurement report may fully occupy uplink resources allocated to the UE reporting the measurement report by the source base station, the UE may report a measurement report without the first core network type information to the source base station.

If the data other than the first core network type information in the measurement report cannot fully occupy the uplink resource allocated to the UE reporting the measurement report by the source base station, the UE may report the measurement report including the first core network type information to the source base station.

As such, the UE may flexibly choose to send the first core network type information to the source base station according to whether the uplink resources allocated by the base station remain or not, on the one hand, the probability that the UE may work normally after handover may be improved, on the other hand, the utilization rate of the uplink resources may be improved, and the waste of the uplink resources may be avoided.

When the measurement report sent from the UE to the source base station includes the first core network type information, the UE, prior to sending the measurement report to the source base station, obtains the type of the core network connected by the base station to which the n respective neighbor cells for the UE belong, and/or the identifier of the network slice supported by the base station to which the n respective neighbor cells belong. Hereinafter, this technical process is briefly described in the embodiments of the present disclosure.

In embodiments of the present disclosure, a base station in a wireless communication system may broadcast system information, where the system information broadcasted by a certain base station may include at least one of a type of a core network accessed by the base station or an identifier of a network slice supported by the base station.

Therefore, in step 403, before the UE sends the measurement report to the source base station, the system information broadcasted by the base station to which each of the n neighbor cells belongs may be received. By receiving the system information broadcasted by the base station to which each neighbor cell belongs in the n neighbor cells, the UE may obtain at least one of a type of a core network accessed by a base station or an identifier of a network slice supported by a base station to which each of the n neighbor cells belongs. Then, the UE may obtain the first core network type information of the n respective neighbor cells.

As described above, according to the instruction of the measurement configuration information from the source base station. the UE may perform a measurement on the neighbor cells with the frequency instructed by the measurement configuration information. In this case, the n neighbor cells in the measurement report may include a first neighbor cell, where the frequency of the first neighbor cell is the frequency that the source base station which instructs the UE to measure.

In addition, after the UE receives the measurement configuration information from the source base station, according to the instruction of the measurement configuration information, the frequency needs to be measured is autonomously determined, and the neighbor cells with the autonomously determined to-be-measured frequency is measured. In this case, the n neighbor cells in the measurement report include a second neighbor cell, where the frequency of the second neighboring cell is not the frequency of the source base station which instructs the UE to measure.

In some embodiments, the n neighbor cells included in the measurement report may include either the first neighbor cell or the second neighbor cell, which is not limited in the embodiments of the present disclosure.

Step 404: The source base station determines, according to the first core network type information, a target base station from base stations to which n respective neighbor cells for the UE belong.

The target base station is a base station to which the UE is to be handed over. For example, the type of the core network accessed by the target base station is the same as the type of the core network to be accessed by the UE. For another example, the identifier of the network slice supported by the target base station is the same as the identifier of the network slice to be accessed by the UE. For another example, the type of the core network accessed by the target base station is the same as the type of the core network to be accessed by the UE, and the identifier of the network slice supported by the target base station is the same as the identifier of the network slice to be accessed by the UE.

Optionally, when the first core network type information indicates the type of the core network accessed by the base station to which the respective neighbor cell belongs, the source base station may determine, according to the first core network type information and the type of the core network to be accessed by the UE, the target base station from base stations to which the n respective neighbor cells for the UE belong.

The manner in which the source base station obtains the type of the core network to be accessed by the UE may include the following two types.

First, the source base station receives second core network type information from the UE, where the second core network type information indicates a type of a core network to be accessed by the UE.

In this way, the UE may determine the type of the core network to be accessed by the UE according to the type of the communication service performed by the UE, and then the UE may send the second core network type information to the source base station, to indicate the type of the core network that the UE needs to access by using the second core network type information.

Second, the source base station obtains the type of the core network accessed by the source base station, and determines the type of the core network accessed by the source base station as the type of the core network to be accessed by the UE.

In general, the source base station can provide the UE with communication service desired by the UE: therefore, the core network accessed by the source base station may generally provide the desired communication service to the UE. Thus, the type of the core network accessed by the source base station is the same as the type of the core network to be accessed by the UE.

The source base station determines the type of the core network accessed by the source base station as the type of the core network to be accessed by the UE, such that the source base station may obtain the type of the core network that the UE needs to access without interacting with the UE, and therefore, the flow of obtaining the type of the core network that the UE needs to access may be simplified.

Upon obtaining the type of the core network to be accessed by the UE, the source base station may determine, according to the first core network type information and the type of the core network to be accessed by the UE, a target base station from base stations to which n respective neighbor cells for the UE belong, where the determined type of the core network accessed by the determined target base station is the same as the type of the core network to be accessed by the UE.

Optionally, when the first core network type information indicates the identifier of the network slice supported by the base station to which the respective neighbor cell belongs, the source base station may determine, according to the first core network type information and the identifier of the network slice to be accessed by the UE, the target base station from base stations to which n respective neighbor cells for the UE belong.

The manner in which the source base station obtains the identifier of the network slice to be accessed by the UE may include the following two types.

First, the source base station receives third core network type information from the UE, where the third core network type information indicates an identifier of a network slice to be accessed by the UE.

In this way, the UE may determine the identifier of the network slice to be accessed by the UE according to the type of the communication service performed by the UE, and then the UE may send the third core network type information to the source base station to indicate the identifier of the network slice to be accessed by the UE by using the third core network type information.

Second, the source base station obtains the identifier of the network slice supported by the source base station, and determines the identifier of the network slice supported by the source base station as the identifier of the network slice to be accessed by the UE.

In general, the source base station may provide the UE with the communication service desired by the UE, and therefore the network slice supported by the source base station may generally provide the desired communication service to the UE. Thus, the identifier of the network slice supported by the source base station is the same as the identifier of the network slice to be accessed by the UE.

The source base station determines the identifier of the network slice supported by the source base station as the identifier of the network slice to be accessed by the UE, such that the source base station may obtain the identifier of the network slice to be accessed by the UE without the interaction of the UE and the source base station. Therefore, the flow of obtaining the identifier of the network slice to be accessed by the UE may be simplified.

Upon obtaining the identifier of the network slice to be accessed by the UE, the source base station may determine, according to the first core network type information and the identifier of the network slice to be accessed by the UE, the target base station from base stations to which the n respective neighbor cells for the UE belong, where the determined identifier of the network slice supported by the target base station is the same as the identifier of the network slice to be accessed by the UE.

Optionally, when the first core network type information indicates the identifier of the network slice supported by the base station to which the respective neighbor cell belongs and the type of the core network accessed by the base station to which the respective neighbor cell belongs, The source base station may determine, based on the first core network type information, the target base station from base stations to which the n respective neighbor cells for the UE belong, the identifier of the network slice to be accessed by the UE, and the type of the core network to be accessed by the UE.

The manners in which the source base station obtains the identifier of the network slice to be accessed by the UE and the source base station obtains the type of the core network to be accessed by the UE are the same as the above description, which is not limited in the embodiments of the present disclosure.

Upon obtaining the identifier of the network slice to be accessed by the UE and the type of the core network to be accessed by the UE, according to the first core network type information, the identifier of the network slice to be accessed by the UE, and the type of the core network to be accessed by the UE. determining a target base station from base stations to which n respective neighbor cells for a UE belong: The determined identifier of the network slice supported by the target base station is the same as the identifier of the network slice to be accessed by the UE. Furthermore, the determined type of the core network accessed by the target base station is the same as the type of the core network accessed by the UE.

Step 405: The source base station sends the handover signaling to the UE.

After the target base station is determined, the source base station may send handover signaling to the UE to handover the UE to the target base station.

Step 406: the UE receives the handover signaling from the source base station, and initiates random access to the target base station according to the instruction of the handover signaling.

In the cell measurement methods provided by the embodiment of the present disclosure, when the cell measurement result satisfies the reporting condition, a measurement report is sent to a source base station, wherein the measurement report includes first core network type information of n respective neighbor cells for a UE: the first core network type information indicates at least one of a type of a core network accessed by a base station to which a respective neighbor cell belongs or an identifier of a network slice supported by a base station to which a respective neighbor cell belongs. As such, the source base station may determine, according to the measurement report, a target base station from base stations to which the n respective neighbor cells belong, and hand over the UE to the target base station, either the core network to which the target base station is connected or the network slice which is supported by the target base station is capable of providing desired communication services to the UE, such that the UE may work normally after handover.

Figure 5:
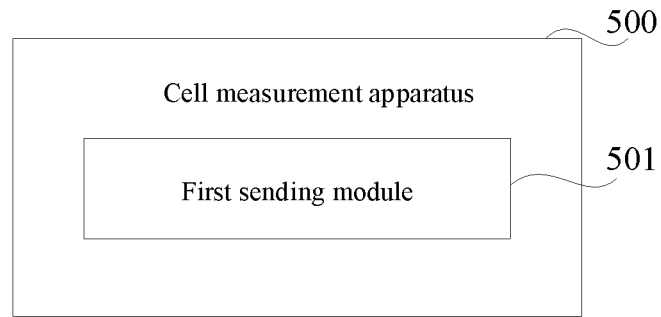
FIG. 5 is a block diagram of cell measurement apparatuses according to exemplary embodiments.

FIG. 5 is a block diagram of cell measurement apparatuses according to exemplary embodiments. The cell measurement apparatus 500 may include the UE 20 shown in FIG. 1. Referring to FIG. 5, the cell measurement apparatus 500 includes a first sending module 501. The first sending module 501 is configured to send a measurement report to a source base station when a cell measurement result satisfies a reporting condition, wherein the measurement report includes first core network type information of n respective neighbor cells for user equipment (UE), where n is a positive integer.

The first core network type information indicates at least one of: a type of a core network accessed by a base station to which a respective neighbor cell belongs, or an identifier of a network slice supported by a base station to which a respective neighbor cell belongs.

In embodiments of the present disclosure, the first sending module 501 is specifically configured to send the measurement report including the first core network type information to the source base station, when the cell measurement result satisfies the reporting condition, and when uplink resources allocated to the UE by the source base station are not fully occupied by other data than the first core network type information in the measurement report.

In embodiments of the present disclosure, the n neighbor cells include a first neighbor cell, and a frequency of the first neighbor cell is a frequency that the source base station instructs the UE to measure.

In embodiments of the present disclosure, he n neighbor cells include a second neighbor cell, and a frequency of the second neighbor cell is not a frequency that the source base station instructs the UE to measure.

Figure 6:
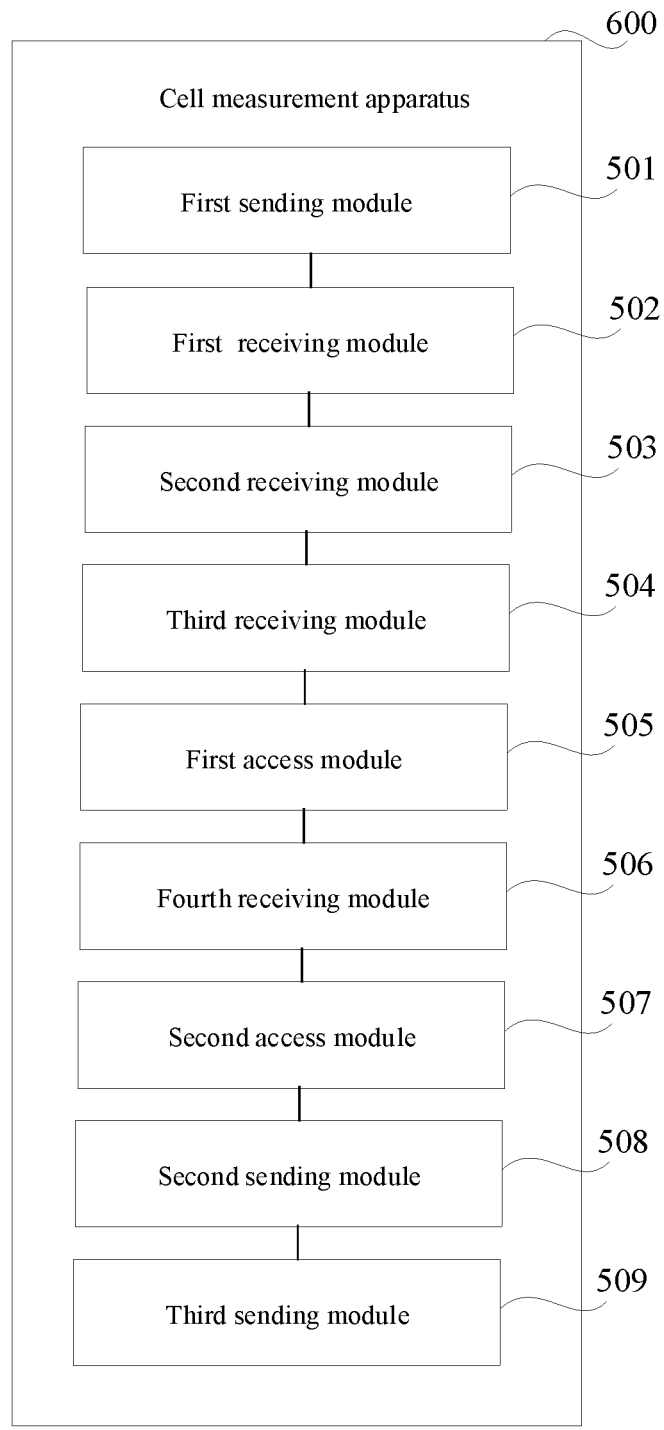
FIG. 6 is a block diagram of cell measurement apparatuses according to exemplary embodiments.

As shown in FIG. 6, in addition to the cell measurement apparatus 500, the embodiments of the present disclosure also provide cell measurement apparatus 600. The cell measurement apparatus 600, in addition to including the module included in the cell measurement apparatus 500, further includes a first receiving module 502, a second receiving module 503, a third receiving module 504, a first access module 505, a fourth receiving module 506, a second access module 507, a second sending module 508 and a third sending module 509.

The first receiving module 502 is configured to receive measurement configuration information from the source base station, where the measurement configuration information instructs the UE to report the first core network type information of n respective neighbor cells to the source base station in the measurement report.

Accordingly, the first sending module 501 is specifically configured to send the measurement report to the source base station according to the instruction of the measurement configuration information when the cell measurement result satisfies the reporting condition.

The second receiving module 503 is configured to receive system information broadcasted by a base station to which each of the n neighbor cells belongs. The system information broadcasted by a base station to which a target neighbor cell belongs includes at least one of: a type of a core network accessed by the base station to which the target neighbor cell belongs, or an identifier of a network slice supported by the base station to which the target neighbor cell belongs, where the target neighbor cell is any one of the n respective neighbor cells.

Accordingly, the first sending module 501 is specifically configured to obtain first core network type information of each of the n respective neighbor cells according to the system information broadcasted by the base station to which each of the n neighbor cell belongs; and send the measurement report including the first core network type information to the source base station when the cell measurement result satisfies the reporting condition.

In embodiments of the present disclosure, when the first core network type information indicates the type of the core network accessed by the base station to which the respective neighbor cell belongs, the third receiving module 504 is configured to receive the handover signaling from the source base station.

The first access module 505 is configured to initiate random access to a target base station according to an instruction of the handover signaling. The target base station is determined by the source base station from base stations to which the n respective neighbor cells belong according to the first core network type information, and a type of a core network accessed by the target base station is the same as a type of a core network to be accessed by the UE.

In embodiments of the present disclosure, when the first core network type information indicates the identifier of the network slice supported by the base station to which the respective neighbor cell belongs, the fourth receiving module 506 is configured to receive handover signaling from the source base station.

The second access module 507 is configured to initiate random access to the target base station according to an instruction of the handover signaling: wherein the target base station is determined by the source base station from the base stations to which the n respective neighbor cells belong according to the first core network type information, and the identifier of the network slice supported by the target base station is the same as an identifier of a network slice to be accessed by the UE.

The second sending module 508 is configured to send second core network type information to the source base station, wherein the second core network type information indicates the type of the core network to be accessed by the UE, and wherein the second core network type information is used for the source base station to determine the target base station from base stations to which the n respective neighbor cells belong, according to the second core network type information and the first core network type information.

The third sending module 509 is configured to send third core network type information to the source base station, wherein the third core network type information indicates the identifier of the network slice to be accessed by the UE, and wherein the third core network type information is used for the source base station to determine the target base station from the base stations to which the n respective neighbor cells belong, according to the third core network type information and the first core network type information.

In the cell measurement apparatuses provided by the embodiments of the present disclosure, when the cell measurement result satisfies the reporting condition, a measurement report is sent to a source base station, where the measurement report includes first core network type information of n respective neighbor cells for the UE: the first core network type information indicates at least one of a type of a core network accessed by a base station to which a respective neighbor cell belongs or an identifier of a network slice supported by a base station to which a respective neighbor cell belongs. As such, the source base station may determine, according to the measurement report, a target base station from base stations to which the n respective neighbor cells belong, and hand over the UE to the target base station, either the core network to which the target base station is connected or the network slice which is supported by the target base station is capable of providing desired communication services to the UE, such that the UE may work normally after handover.

Figure 7:
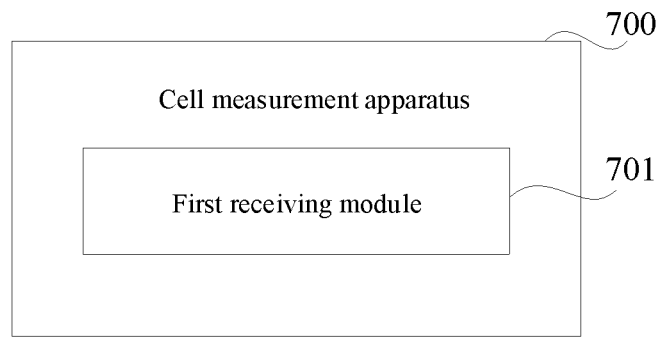
FIG. 7 is a block diagram of cell measurement apparatuses according to exemplary embodiments.

FIG. 7 is a block diagram of cell measurement apparatuses 700, which may be the source base station 10 shown in FIG. 1, according to exemplary embodiments. Referring to FIG. 7, cell measurement apparatus 700 includes a first receiving module 701.

The first receiving module 701 is configured to receive a measurement report being sent from user equipment (UE) to a source base station when a cell measurement result satisfies a reporting condition and including first core network type information of n respective neighbor cells for the UE, where n is a positive integer.

The first core network type information indicates at least one of: a type of a core network accessed by a base station to which a respective neighbor cell belongs, or an identifier of a network slice supported by a base station to which a respective neighbor cell belongs.

In embodiments of the present disclosure, the measurement report is sent from the UE to the source base station when the cell measurement result satisfies the reporting condition, and uplink resources allocated to the UE by the source base station are not fully occupied by another data than the first core network type information in the measurement report.

In embodiments of the present disclosure, the first core network type information of the n respective neighbor cells is obtained by the UE according to system information broadcasted by a base station to which each of the n neighbor cells belongs. The; system information broadcasted by a base station to which a target neighbor cell belongs includes at least one of: a type of a core network accessed by the base station to which the target neighbor cell belongs, or an identifier of a network slice supported by the base station to which the target neighbor cell belongs, where the target neighbor cell is any one of the n respective neighbor cells.

In embodiments of the present disclosure, the n neighbor cells include a first neighbor cell, and a frequency of the first neighbor cell is a frequency that the source base station instructs the UE to measure.

In embodiments of the present disclosure, the n neighbor cells include a second neighbor cell, and a frequency of the second neighbor cell is not a frequency that the source base station instructs the UE to measure.

Figure 8:
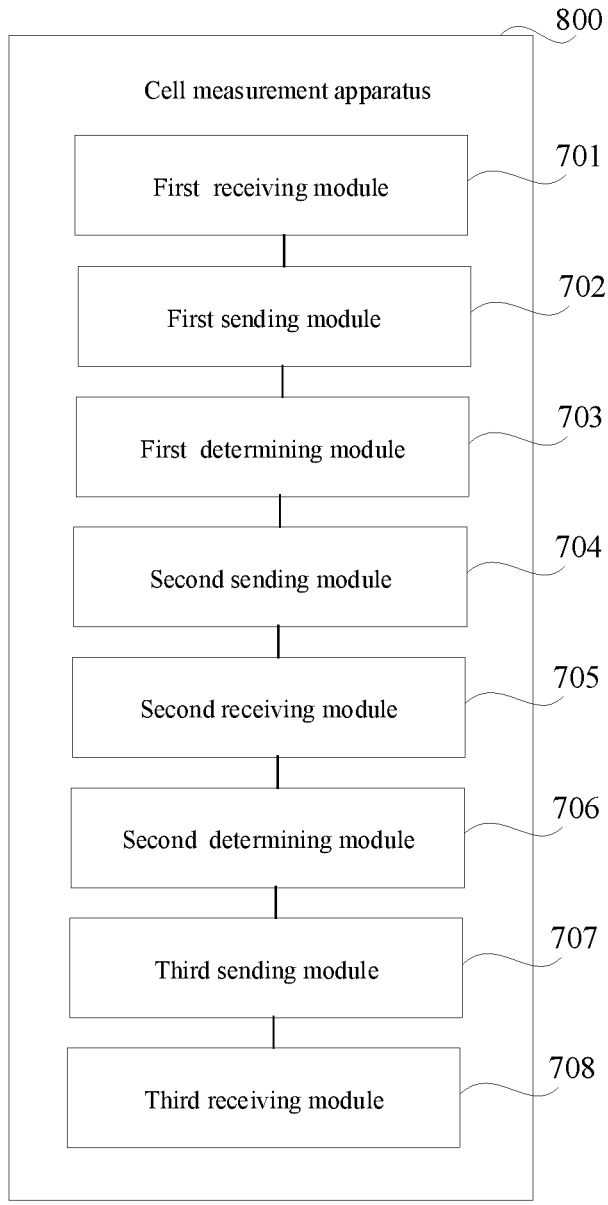
FIG. 8 is a block diagram of cell measurement apparatuses according to exemplary embodiments.

As shown in FIG. 8, in addition to the cell measurement apparatuses 700, the embodiments of the present disclosure also provide cell measurement apparatus 800. The cell measurement apparatus 800, in addition to including the module included in the cell measurement apparatus 700, further includes a first sending module 702, a first determining module 703, a second sending module 704, a second receiving module 705, a second determining module 706, a third sending module 707 and a third receiving module 708.

The first sending module 702 is configured to send measurement configuration information to the UE, where the measurement configuration information instructs the UE to report the first core network type information of the n respective neighbor cells to the source base station in the measurement report.

When the first core network type information indicates the type of the core network accessed by the base station to which the respective neighbor cell belongs, the first determining module 703 is configured to determine a target base station from base stations to which the n neighbor cells belong according to the first core network type information, wherein a type of a core network accessed by the target base station is the same as a type of a core network to be accessed by the UE.

The second sending module 704 is configured to send handover signaling to the UE, wherein the handover signaling instructs the UE to initiate random access to the target base station.

The second receiving module 705 is configured to receive second core network type information from the UE, wherein the second core network type information indicates a type of a core network to be accessed by the UE.

The first determining module 703 is specifically configured to determine the target base station from the base stations to which the n respective neighbor cells belong according to the first core network type information and the second core network type information.

In embodiments of the present disclosure, the first determining module 703 is specifically configured to obtain a type of a core network accessed by the source base station; determine the type of the core network accessed by the source base station as the type of the core network to be accessed by the UE; and determine, according to the first core network type information and the type of the core network to be accessed by the UE, the target base station from the base stations to which the n respective neighbor cells belong.

When the first core network type information indicates the identifier of the network slice supported by the base station to which the respective neighbor cell belongs, the second determining module 706 is configured to determine a target base station from base stations to which the n neighbor cells belong according to the first core network type information, wherein the identifier of the network slice supported by the target base station is the same as an identifier of a network slice to be accessed by the UE.

The third sending module 707 is configured to send handover signaling to the UE, wherein the handover signaling instructs the UE to initiate random access to the target base station.

The third receiving module 708 is configured to receive third core network type information from the UE, wherein the third core network type information indicates the identifier of the network slice to be accessed by the UE.

Accordingly, the second determining module 706 is specifically configured to determine the target base station from the base stations to which the n respective neighbor cells belong according to the first core network type information and the third core network type information.

In embodiments of the present disclosure, the second determining module 706 is specifically configured to obtain the identifier of the network slice supported by the source base station; determine the identifier of the network slice supported by the source base station as the identifier of the network slice to be accessed by the UE; and determining, according to the first core network type information and the identifier of the network slice to be accessed by the UE, the target base station from the base stations to which the n respective neighbor cells belong.

As described above, cell measurement apparatuses are provided according to some embodiments of the present disclosure, by receiving the measurement report from the UE when the cell measurement result satisfies the reporting condition, wherein the measurement report includes first core network type information of n respective neighbor cells for a UE: The first core network type information indicates at least one of a type of a core network accessed by a base station to which a respective neighbor cell belongs and an identifier of a network slice supported by a base station to which a respective neighbor cell belongs. As such, the source base station may determine, according to the measurement report, a target base station from base stations to which the n respective neighbor cells belong, and hand over the UE to the target base station, either the core network to which the target base station is connected or the network slice which is supported by the target base station is capable of providing desired communication services to the UE, such that the UE may work normally after handover.

Figure 9:
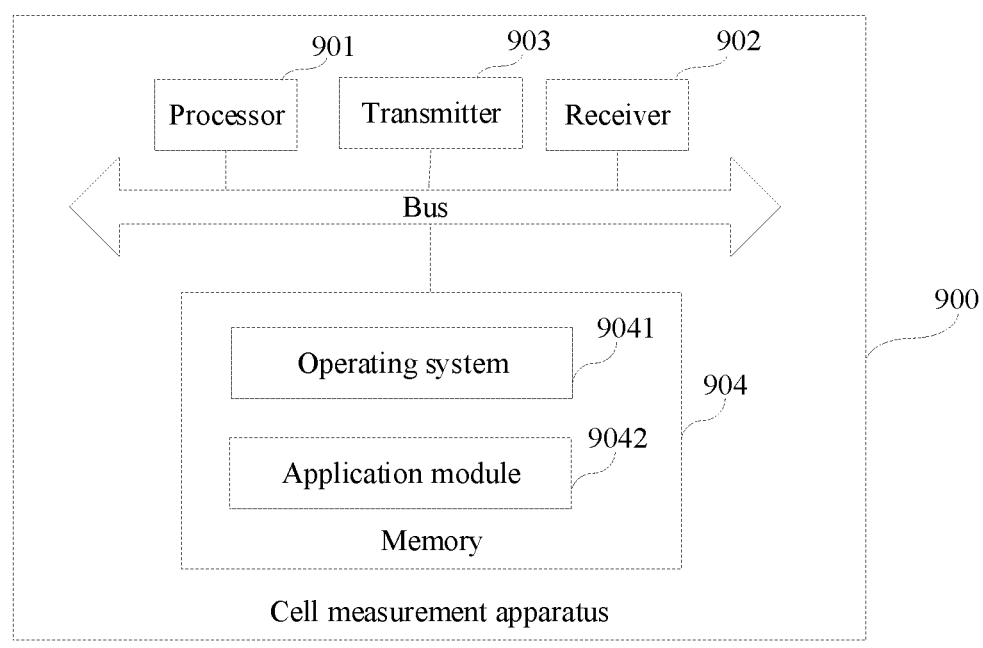
FIG. 9 is a block diagram of cell measurement apparatuses according to exemplary embodiments.

FIG. 9 is a block diagram of cell measurement apparatus 900 according to exemplary embodiments. For example, cell measurement apparatus 900 may include a base station. As shown in FIG. 9, the cell measurement apparatus 900 may include a processor 901, a receiver 902, a transmitter 903, and memory 904. The receiver 902, the transmitter 903 and the memory 904 are respectively connected to the processor 901 via a bus.

The processor 901 includes one or more processing cores, and the processor 901 operates a software program and a module to execute the method executed by the source base station in the cell measurement methods provided by the embodiments of the present disclosure. Memory 904 may be used to store software programs and modules. Specifically, the memory 904 may store an operating system 9041 and an application module 9042 for at least one function. The receiver 902 is configured to receive communication data from other devices, and the transmitter 903 is configured to send communication data to other devices.

Figure 10:
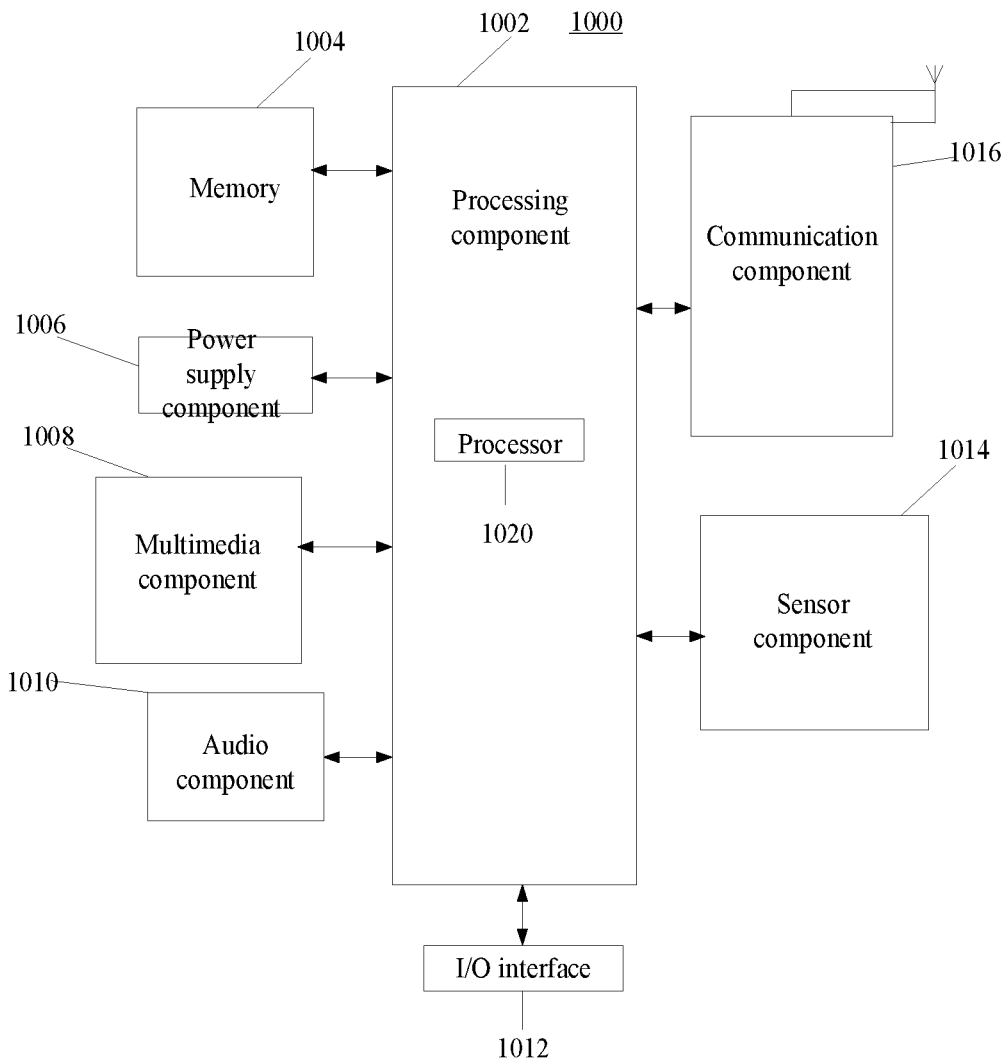
FIG. 10 is a block diagram of cell measurement apparatuses according to exemplary embodiments.

FIG. 10 is a block diagram of cell measurement apparatus 1000 according to exemplary embodiments. For example, the apparatus 1000 may include mobile phones, computers, digital broadcasted terminals, message transceivers, game consoles, tablet devices, medical devices, fitness devices, personal digital assistants and so on.

Referring to FIG. 10, the apparatus 1000 may include one or more of the following components: a processing component 1002, memory 1004, a power supply component 1006, a multimedia component 1008, an audio component 1010, an input/output (I/O) interface 1012, a sensor component 1014, and a communication component 1016.

The processing component 1002 generally controls overall operations of the apparatus 1000, such as operations associated with display, phone calls, data communications, camera operations, and recording operations. The processing component 1002 may include one or more processors 1020 to execute instructions to complete all or part of the steps of the above method embodiments implemented by UE 20. In addition, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any application or method operated on the apparatus 1000, contact data, phonebook data, messages, pictures, videos, and so on. The memory 1004 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1006 provides power to different components of the apparatus 1000. The power supply component 1006 may include a power management system, one or more power supplies, and other components associated with generating, managing, and distributing power for the apparatus 1000.

The multimedia component 1008 includes a screen providing an output interface between the apparatus 1000 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1008 may include a front camera and/or a rear camera. The front camera and/or rear camera may receive external multimedia data when the apparatus 1000 is in an operating mode, such as a photographing mode or a video mode. Each of the front camera and the rear camera may be a fixed optical lens system or have focal length and optical zooming capability.

The audio component 1010 is configured to output and/or input an audio signal. For example, the audio component 1010 includes a microphone (MIC). When the apparatus 1000 is in an operating mode, such as a call mode, a recording mode, and a voice recognition mode, the MIC is configured to receive an external audio signal. The received audio signal may be further stored in the memory 1004 or sent via the communication component 1016. In some examples, the audio component 1010 further includes a speaker to output an audio signal.

The I/O interface 1012 may provide an interface between the processing component 1002 and peripheral interface modules. The above peripheral interface modules may include a keyboard, a click wheel, buttons and so on. These buttons may include, but are not limited to, a home button, a volume button, a starting button and a locking button.

The sensor component 1014 includes one or more sensors to provide status assessments of various aspects for the apparatus 1000. For example, the sensor component 1014 may detect the on/off status of the apparatus 1000, and relative positioning of component, for example, the component is a display and a keypad of the apparatus 1000. The sensor component 1014 may also detect a change in position of the apparatus 1000 or a component of the apparatus 1000, a presence or absence of the contact between a user and the apparatus 1000, an orientation or an acceleration/deceleration of the apparatus 1000, and a change in temperature of the apparatus 1000. The sensor component 1014 may include a proximity sensor to detect the presence of a nearby object without any physical contact. The sensor component 1014 may further include an optical sensor, such as a Complementary Metal-Oxide-Semiconductor (CMOS) or Charged Coupled Device (CCD) image sensor which is used in imaging applications. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 may access a wireless network that is based on a communication standard, such as Wi-Fi, 2G or 3G, or a combination thereof. In an example, the communication component 1016 receives a broadcasted signal or broadcast-associated information from an external broadcasted management system via a broadcasted channel. In an example, the communication component 1016 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1000 may be implemented by one or more Application Specific Integrated Circuits (ASIC), Digital Signal Processors (DSP), Digital Signal Processing Devices (DSPD), programmable Logic Devices (PLD), Field Programmable Gate Arrays (FPGA), controllers, microcontrollers, microprocessors, or other electronic components for performing the above method embodiments implemented by UE 20.

In an example, there is also provided a non-transitory machine-readable storage medium including instructions, such as memory 1004 including instructions. The above instructions may be executed by the processor 1020 of the apparatus 1000 to perform the above methods embodiments implemented by UE 20. For example, the non-transitory machine-readable storage media may include a Read-Only Memory (ROM), a Random-Access Memory (RAM), a Compact disc ROM (CD-ROM), a magnetic tape, a floppy disk, an optical data storage device and so on.

Figure 11:
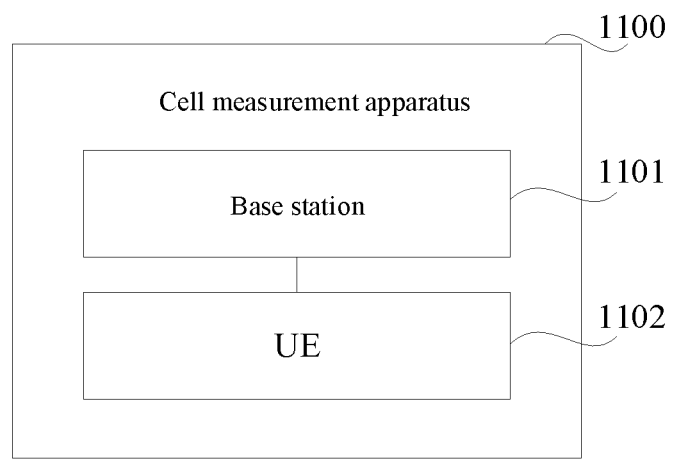
FIG. 11 is a block diagram of cell measurement systems according to exemplary embodiments.

FIG. 11 is a block diagram of cell measurement system 1100 according to exemplary embodiments. As shown in FIG. 11, the cell measurement system 1100 includes a source base station 1101 and a UE 1102.

The source base station 1101 is configured to perform the cell measurement method implemented by the source base station in the embodiment shown in FIG. 4.

The UE 1102 is configured to perform the cell measurement method implemented by the UE in the embodiment shown in FIG. 4.

In exemplary embodiments, a computer-readable storage medium is further provided, the computer-readable storage medium is a non-transitory computer-readable storage medium, a computer program is stored in the computer-readable storage medium, and when the stored computer program is executed by a processing component, the cell measurement methods provided by the above embodiments of the present disclosure may be implemented.

Computer program products are provided according to some embodiments of the present disclosure, in which instructions are stored in the computer program product, and when running on a computer, the computer is enabled to execute the cell measurement methods provided by the embodiments of the present disclosure.

Chips are provided according to embodiments of the present disclosure, where the chip includes a programmable logic circuit and/or program instructions, and when the chip runs, the cell measurement methods provided by the embodiments of the present disclosure may be executed.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:
1. A cell measurement method, comprising:
receiving measurement configuration information from a source base station;
performing cell measurement according to the measurement configuration information;
sending, when a cell measurement result satisfies a reporting condition, a measurement report to the source base station,
wherein, the sending comprises:
in response to that the measurement configuration information includes core network type reporting information, the measurement report comprises first core net- work type information of n respective neighbor cells for user equipment (UE), and n is a positive integer; and in response to that the measurement configuration information does not include the core network type reporting information, the UE determines whether data other than the first core network type information in the measurement report fully occupy uplink resources allocated to the UE by the source base station, wherein:

in response to that data other than the first core network type information in the measurement report fully occupy uplink resources allocated to the UE by the source base station, the measurement report does not include the first core network type information, and in response to that data other than the first core network type information in the measurement report does not fully occupy uplink resources allocated to the UE by the source base station, the measurement report includes the first core network type information, wherein the first core network type information indicates at least one of:
 a type of a core network accessed by a base station to which a respective neighbor cell belongs, or
 an identifier of a network slice supported by a base station to which a respective neighbor cell belongs.

2. The method of claim 1, wherein the method further comprises:
receiving system information broadcasted by a base station to which each of the n respective neighbor cells belongs;
wherein system information broadcasted by a base station to which a target neighbor cell belongs comprises at least one of:
 a type of a core network accessed by the base station to which the target neighbor cell belongs, or
 an identifier of a network slice supported by the base station to which the target neighbor cell belongs, and
 the target neighbor cell is any one of the n respective neighbor cells;
sending, when the cell measurement result satisfies the reporting condition, the measurement report to the source base station comprises:
 obtaining first core network type information of each of the n respective neighbor cells according to the system information broadcasted by the base station to which each of the n neighbor cell belongs;
 sending the measurement report including the first core network type information to the source base station when the cell measurement result satisfies the reporting condition.

3. The method of claim 1, wherein the n neighbor cells comprise a first neighbor cell, and a frequency of the first neighbor cell is a frequency that the source base station instructs the UE to measure; or
 the n neighbor cells comprise a second neighbor cell, and a frequency of the second neighbor cell is not a frequency that the source base station instructs the UE to measure.

4. The method of claim 1, wherein when the first core network type information indicates the type of the core network accessed by the base station to which the respective neighbor cell belongs, the method further comprises:
 receiving handover signaling from the source base station;
 initiating random access to a target base station according to an instruction of the handover signaling;
 wherein the target base station is determined by the source base station from the base stations to which the n respective neighbor cells belong according to the first core network type information, and a type of a core network accessed by the target base station is the same as a type of a core network to be accessed by the UE.

5. The method of claim 4, wherein the method further comprises:
 sending second core network type information to the source base station,
 wherein the second core network type information indicates the type of the core network to be accessed by the UE, and
 wherein the second core network type information is used for the source base station to determine the target base station from base stations to which the n respective neighbor cells belong, according to the second core network type information and the first core network type information.

6. The method of claim 5, further comprising:
 determining the type of the core network to be accessed by the UE according to a type of a communication service performed by the UE; and
 determining the type of the core network to be accessed by the UE as the second core network type information.

7. The method of claim 4, wherein the type of the core network to be accessed by the UE is a type of a core network accessed by the source station.

8. The method of claim 1, wherein when the first core network type information indicates the identifier of the network slice supported by the base station to which the respective neighbor cell belongs, the method further comprises:
 receiving handover signaling from the source base station;
 initiating random access to the target base station according to an instruction of the handover signaling;
 wherein the target base station is determined by the source base station from the base stations to which the n respective neighbor cells belong according to the first core network type information, and the identifier of the network slice supported by the target base station is the same as an identifier of a network slice to be accessed by the UE.

9. The method of claim 8, further comprising:
 sending third core network type information to the source base station, wherein the third core network type information indicates an identifier of a network slice supported by the UE, and is used for the source base station to determine the target base station from the base stations to which the n respective neighbor cells belong, according to the third core network type information and the first core network type information.

10. The method of claim 9, further comprising:
 determining the identifier of the network slice to be accessed by the UE according to a type of a communication service performed by the UE; and
 determining the identifier of the network slice to be accessed by the UE as the third core network type information.

11. The method of claim 8, wherein the identifier of the network slice to be accessed by the UE is an identifier of a network slice supported by the source station.

12. A cell measurement method, comprising:
 sending measurement configuration information to user equipment (UE);
 receiving a measurement report being sent from the UE to a source base station when a cell measurement result measured by the UE according to the measurement configuration information satisfies a reporting condition, wherein the receiving comprises:

in response to that the measurement configuration information includes core network type reporting information, the measurement report comprises first core network type information of n respective neighbor cells for the UE, where n is a positive integer; and in response to that the measurement configuration information does not include the core network type reporting information, and data other than the first core network type information in the measurement report fully occupy uplink resources allocated to the UE by the source base station, the measurement report does not include the first core network type information, and in response to that the measurement configuration information does not include the core network type reporting information, and data other than the first core network type information in the measurement report does not fully occupy uplink resources allocated to the UE by the source base station, the measurement report includes the first core network type information, wherein the first core network type information indicates at least one of:

a type of a core network accessed by a base station to which a respective neighbor cell belongs, or an identifier of a network slice supported by a base station to which a respective neighbor cell belongs.

13. The method of claim 12, wherein the first core network type information of the n respective neighbor cells is obtained by the UE according to system information broadcasted by a base station to which each of the n neighbor cells belongs;

system information broadcasted by a base station to which a target neighbor cell belongs comprises at least one of:

a type of a core network accessed by the base station to which the target neighbor cell belongs, or an identifier of a network slice supported by the base station to which the target neighbor cell belongs, and the target neighbor cell is any one of the n respective neighbor cells.

14. The method of claim 12, wherein the n neighbor cells comprise a first neighbor cell, and a frequency of the first neighbor cell is a frequency that the source base station instructs the UE to measure; or the n neighbor cells comprise a second neighbor cell, and a frequency of the second neighbor cell is not a frequency that the source base station instructs the UE to measure.

15. The method of claim 12, wherein when the first core network type information indicates the type of the core network accessed by the base station to which the respective neighbor cell belongs, the method further comprises:

determining, according to the first core network type information, a target base station from base stations to which the n neighbor cells belong, wherein a type of a core network accessed by the target base station is the same as a type of a core network to be accessed by the UE;

sending handover signaling to the UE, wherein the handover signaling instructs the UE to initiate random access to the target base station.

16. The method of claim 15, wherein the method further comprises:

receiving second core network type information from the UE, wherein the second core network type information indicates a type of a core network to be accessed by the UE;

determining the target base station from the base stations to which the n respective neighbor cells belong according to the first core network type information comprises:

determining, according to the first core network type information and the second core network type information, the target base station from the base stations to which the n respective neighbor cells belong.

17. The method of claim 15, wherein the determining the target base station from the base stations to which the n respective neighbor cells belong according to the first core network type information comprises:

obtaining a type of a core network accessed by the source base station;

determining the type of the core network accessed by the source base station as the type of the core network to be accessed by the UE;

determining, according to the first core network type information and the type of the core network to be accessed by the UE, the target base station from the base stations to which the n respective neighbor cells belong.

18. The method of claim 12, wherein when the first core network type information indicates the identifier of the network slice supported by the base station to which the respective neighbor cell belongs, the method further comprises:

determining, according to the first core network type information, a target base station from base stations to which the n respective neighbor cells belong, wherein the identifier of the network slice supported by the target base station is the same as an identifier of a network slice to be accessed by the UE;

sending handover signaling to the UE, wherein the handover signaling instructs the UE to initiate random access to the target base station.

19. User equipment (UE), comprising:

a processor;

memory for storing instructions executed by the processor;

wherein the processor is configured to:

receive measurement configuration information from a source base station;

perform cell measurement according to the measurement configuration information;

send a measurement report to the source base station when a cell measurement result satisfies a reporting condition, wherein the sending comprises:

in response to that the measurement configuration information includes core network type reporting information, the measurement report comprises first core network type information of n respective neighbor cells for the UE, where n is a positive integer; and in response to that the measurement configuration information does not include the core network type reporting information, the UE determines whether data other than the first core network type information in the measurement report fully occupy uplink resources allocated to the UE by the source base station, wherein:

in response to that data other than the first core network type information in the measurement report fully occupy uplink resources allocated to the UE by the source base station, the measurement report does not include the first core network type information, and in response to that data other than the first core network type information in the measurement report does not fully occupy uplink resources allocated to the UE by the source base station, the measurement report includes the first core network type information, wherein the first core network type information indicates at least one of a type of a core network accessed by a base station to which a respective neighbor cell belongs or an identifier of a network slice supported by a base station to which a respective neighbor cell belongs.

20. A base station implementing the method of claim 12, comprising:

a processor;

memory for storing instructions executed by the processor;

wherein the processor is configured to implement steps of the method.

* * * * *